United States Patent [19]

Liss

[11] Patent Number: 5,255,439
[45] Date of Patent: Oct. 26, 1993

[54] SPAGHETTI TOOL

[76] Inventor: Olle G. Liss, Sturegatan 9, S-753 14 Uppsala, Sweden

[21] Appl. No.: 842,412
[22] PCT Filed: Sep. 25, 1990
[86] PCT No.: PCT/SE90/00610
§ 371 Date: Mar. 26, 1992
§ 102(e) Date: Mar. 26, 1992
[87] PCT Pub. No.: WO91/04699
PCT Pub. Date: Apr. 18, 1991

[30] Foreign Application Priority Data

Sep. 26, 1989 [SE] Sweden .................. 8903157

[51] Int. Cl.$^5$ .................. A47J 43/28; A47J 43/00
[52] U.S. Cl. .................. 30/322; 30/324
[58] Field of Search .................. 30/322, 324, 345, 129, 30/137, 147, 322, 324, 325

[56] References Cited

U.S. PATENT DOCUMENTS

| | | | |
|---|---|---|---|
| D. 168,127 | 11/1952 | Schoenfeld | 30/322 |
| 265,158 | 6/1882 | Green . | |
| 284,342 | 6/1886 | Campbell . | |
| 416,736 | 12/1889 | McPherson | 30/322 |
| 1,907,737 | 5/1933 | Christie | 30/345 |
| 2,664,630 | 1/1954 | Lawson | 30/322 |
| 2,810,957 | 10/1957 | Nelson | 30/324 |
| 2,813,498 | 11/1957 | Senzani | 83/932 |
| 4,120,094 | 10/1978 | Pfaelzer . | |
| 4,165,565 | 8/1979 | Cloutier . | |
| 4,889,367 | 12/1989 | Miller | 283/81 |

FOREIGN PATENT DOCUMENTS 388860 3/1933 United Kingdom .................. 30/322

Primary Examiner—Frank T. Yost
Assistant Examiner—Paul M. Heyrana, Sr.
Attorney, Agent, or Firm—Jeffrey Slusher

[57] ABSTRACT

A spaghetti tool has a shaft that has a grippable portion and a base portion, which is located at a first end the shaft and from which protruding elements extend. In one embodiment, the shaft forms a substantially semi-cylindrical channel into which uncooked spaghetti can be laid. Markings on the inner wall of the shaft, corresponding to the height to which the uncooked spaghetti reaches in the channel, indicate the amount of spaghetti so that the correct amount of uncooked spaghetti can be measured out to yield a desired amount of cooked spaghetti. The markings can be letters or numbers to indicate either the number of portions or a numerical quantity corresponding, for example, to spaghetti weight. In another embodiment, the protruding elements are of substantially constant length and are arranged in parallel rows and/or columns with predetermined row/column separations. Uncooked spaghetti is then measured by placing it between rows or column of protruding elements, which are marked corresponding to the amount of spaghetti that can be held between them. In both embodiments, the tool can be used to stir and grab spaghetti cooking in a pot.

12 Claims, 6 Drawing Sheets

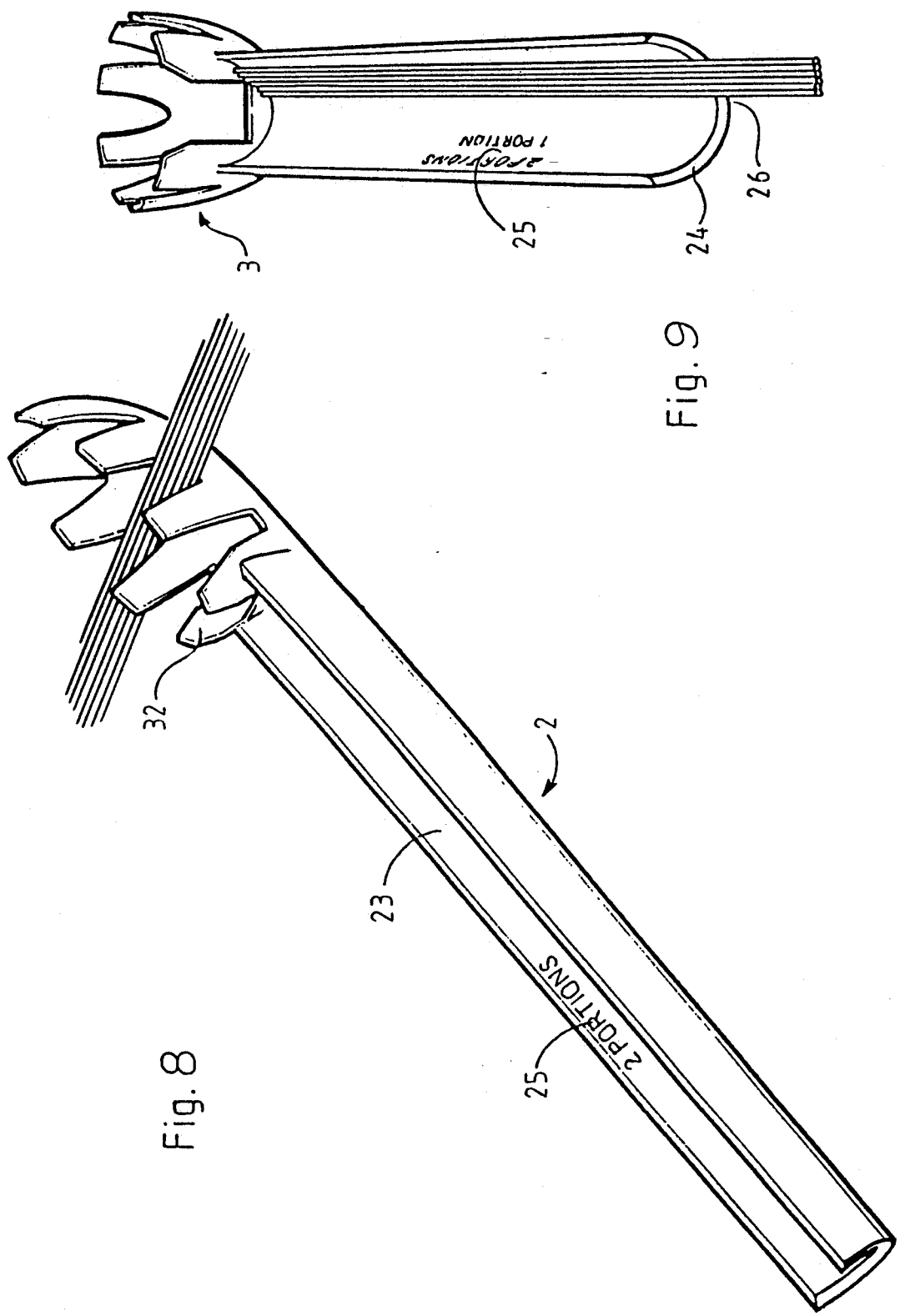

SPAGHETTI TOOL

FIELD OF THE INVENTION

This invention relates to a spaghetti tool by means of which it is possible to accurately decide how large the amount of spaghetti to be cooked should be, in order to obtain the desired cooked amount.

DESCRIPTION RELATED ART

When cooking spaghetti there is the general problem that it is hard to estimate how much cooked spaghetti a certain amount of uncooked spaghetti will result in. The problem is due to the fact that spaghetti swells considerably when cooked. The ratio of swelling is in principle constant per unit of volume, but as has already been said, it is difficult to estimate. This difficulty very often results in either an insufficient amount of cooked spaghetti or an excessive amount, both of which of course are undesirable.

A known device for measuring or meting spaghetti is a plate in which there are a number of holes, by means of which it is possible to measure out a certain amount of spaghetti. This known device, however, presents a number of disadvantages. First, it is rather complicated to use if a certain precision is desired. Furthermore, it is relatively space-occupying and inflexible. Moreover, this known device presents a grabber per se that cannot be used for other purposes, in a kitchen which is already overwhelmed with grabbers.

There is known a further grabber that solves this latter problem, and by means of which it is possible to measure the amount of uncooked spaghetti and also to grab the cooked spaghetti. This measuring device, however, uses the same principle as the aforementioned plate, namely, a hole, which, as has been already mentioned is relatively complicated to use. Furthermore, the use of holes limits the possibilities of having several different measurement sizes also severely limited the maximum possible size of the measuring device.

OBJECT OF THE INVENTION

It is consequently an object of the invention to create a grabber which eliminates the above-mentioned disadvantages.

The invention is based on the face that a certain amount of uncooked spaghetti, after being cooked by boiling for a certain amount of time, absorbs a certain amount of fluid. The increase in volume and, therefore, also the amount of cooked spaghetti, can accordingly be predetermined if the starting amount (measured by volume) is known. Furthermore, the density is also substantially constant, which implies that the increase in weight can also be predetermined.

Considering the above one can see that a cooked portion of spaghetti can be measured before cooking by measuring the corresponding volume of uncooked spaghetti.

The object of the invention is accordingly to create a grabber by means of which the volume and therefore also the weight of a certain amount of uncooked spaghetti can be easily determined, which simultaneously allows the user to determine beforehand the number of portions being cooked, and which enables grabbing of the cooked spaghetti after it is cooked. Such a grabber diminishes the number of grabbers in the kitchen and eliminates the risk of not finding one of the necessary grabbers. Moreover, the invention provides the above advantages in a very effective and functional manner by using parts of the grabber which are "necessary" for the grabbing of the cooked spaghetti to form supporting means for the measuring of uncooked spaghetti. Furthermore, these supporting means can be made very easy to use, since it is possible to place the spaghetti in the supports without having to approach them from one certain direction.

For a given type of spaghetti it can be assumed that the length is almost constant. Hence, it is possible to determine the volume by measuring the area of the cross-section of a bunch of spaghetti, whose length L is constant. The cross-sectional area Y can be measured in many ways. The volume, however, is always calculated in the same way, i.e. by multiplication of the cross-sectional area and the length, $Y \times L$.

The device according to the invention accordingly preferably provides a grabber by means of which it is possible to directly measure the number of portions.

BRIEF DESCRIPTION OF THE DRAWINGS

In the following the invention will be described more in detail, by way of example only, with reference to the drawings, in which:

FIG. 8 is a perspective view from the side of a preferred embodiment of the invention; and FIG. 9 is a perspective view from one end of the preferred embodiment.

DESCRIPTION OF THE PREFERRED EMBODIMENT

Figure 1:
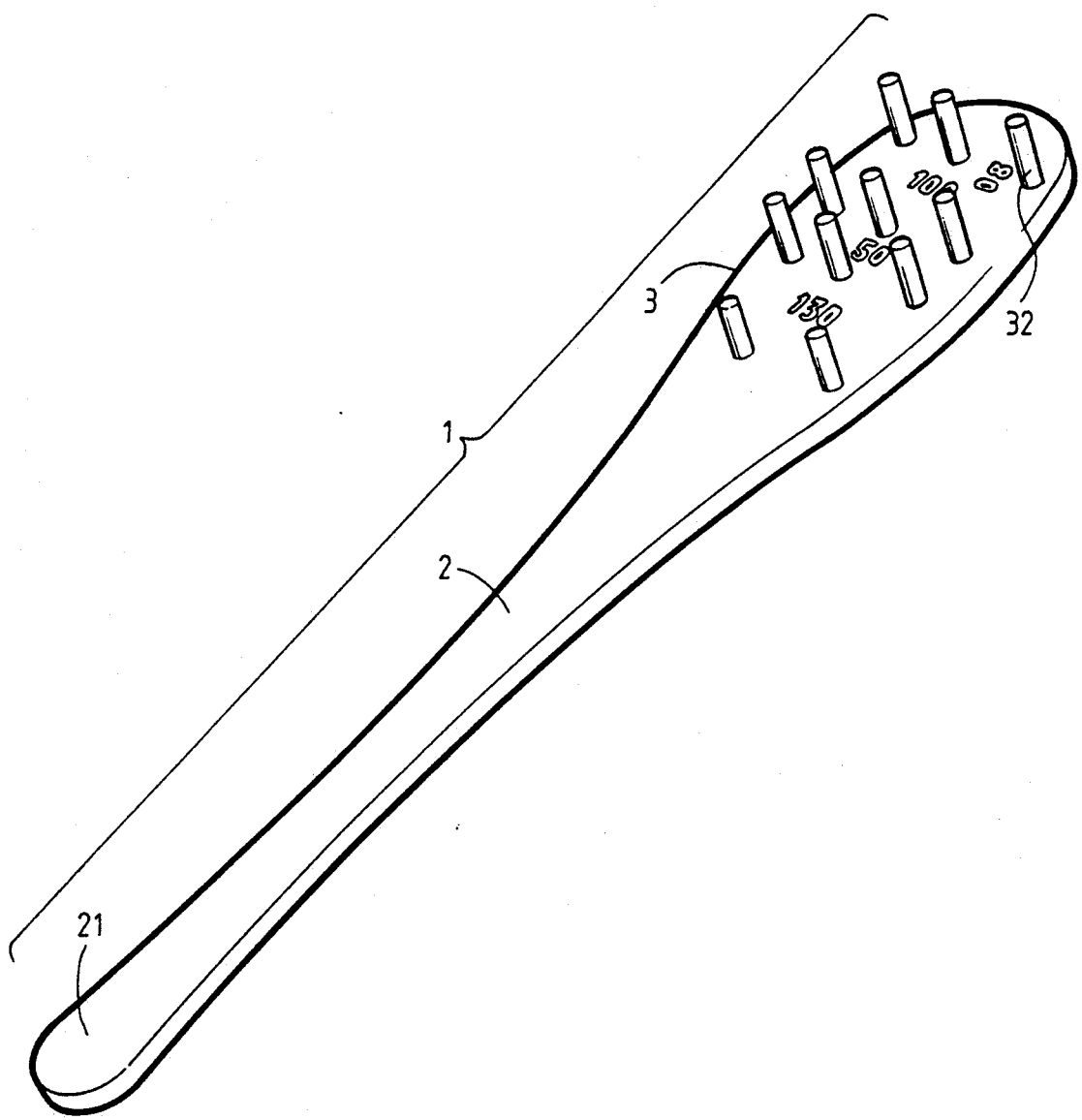
FIG. 1 shows a first embodiment of a grabber in accordance with the intention.
Figure 7:
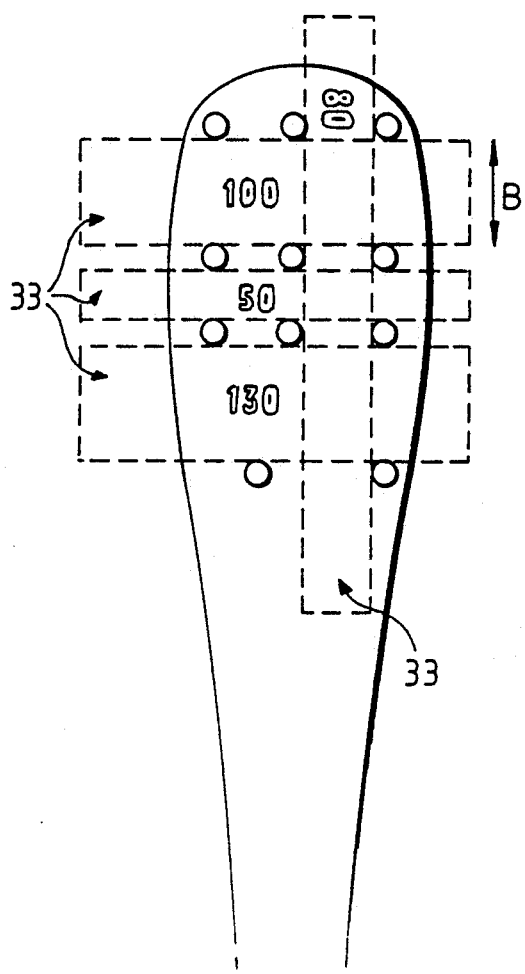
FIG. 7 is a more detailed presentation of FIG. 2.
Figures 2, 3:
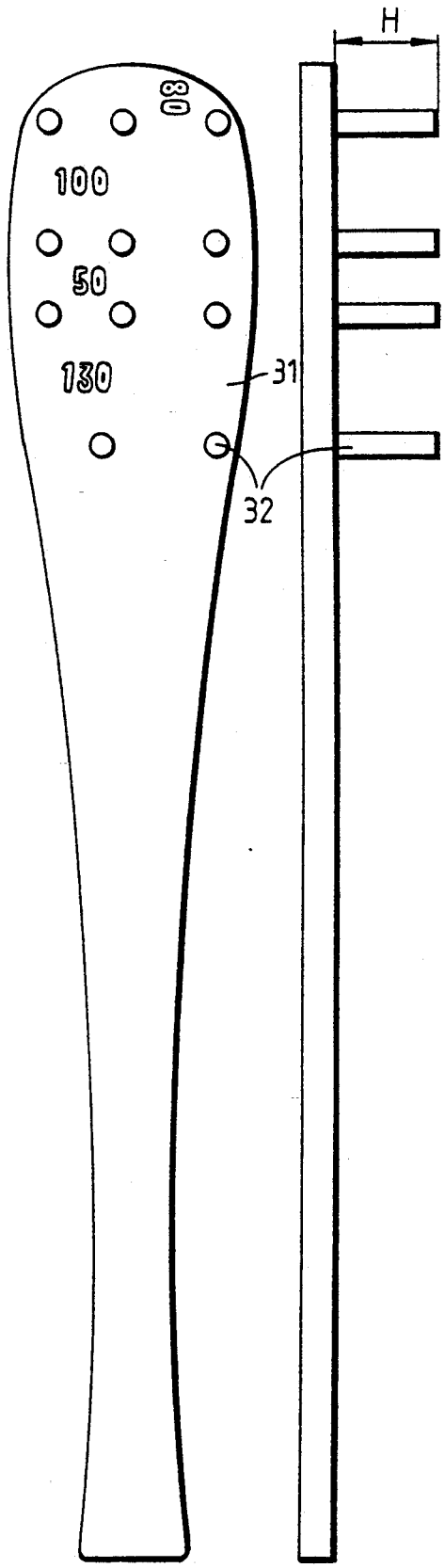
FIG. 2 shows the grabber seen from above.
FIG. 3 shows a side view of the grabber.
Figure 4:
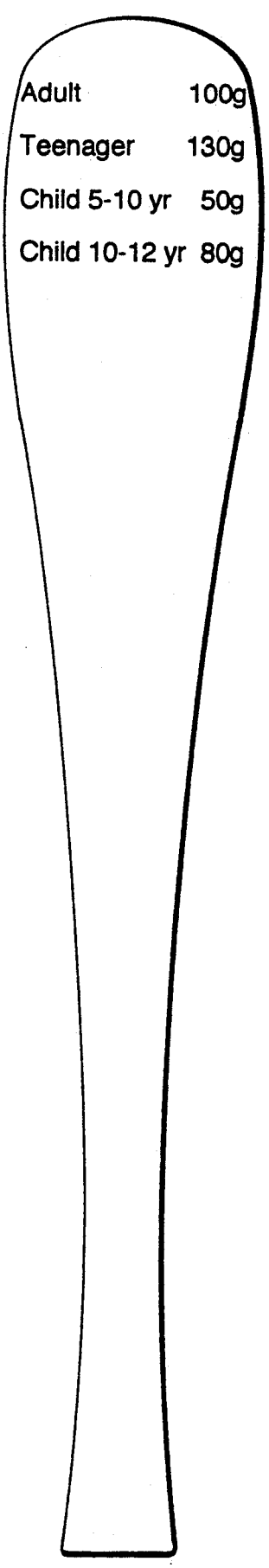
FIG. 4 shows a preferred back side of the grabber.

FIG. 1 shows a grabber 1, which has having a shaft 2, a grippable portion 21, and a spaghetti grabbing device 3. The grabbing device 3 consists of a base surface 31, from which a number of elements 32 protrude. These protruding elements 32 (see also FIGS. 2 and 3) are symmetrically positioned in certain predetermined directions so that they divide the base surface 31 into a number of separate rectangular base areas 33 (se FIG. 7). The width B of such an area 33 is accordingly constant within each such separate area. Furthermore, as is shown, each protruding element 32 has the same height H.

According to the invention, the illustrated grabber functions both as a spaghetti-grabbing tool for cooked spaghetti (in a known manner) and as a measuring tool, as will be described below. Assuming that the grabber is developed for a certain kind of spaghetti S, for which each spaghetti strand has a given length $L_S$, a given diameter $D_S$ and a given density $\rho_S$, the weight of a single spaghetti strand will be as follows:

$$\frac{L_s \times D_s^2 \times \pi}{4} \times \rho_s$$

Accordingly, the weight of a certain number $N_S$ of spaghetti strands is as follows:

$$\frac{L_s \times D_s^2 \times \pi}{4} \times \rho_s \times N_s$$

All of the above factors are constant except for $N_S$. Consequently, the weight of spaghetti is proportional to the number of individual spaghetti strands.

If a tightly packed bunch of spaghetti is created, it can be assumed that each spaghetti occupies a cross-sectional area which corresponds to the square of the diameter $D_S$. Hence, the total cross-sectional area of that bunch is $D_S^2 \times N_S$. Accordingly, the total cross-sectional area $Y_S$ is directly proportional to the number $N_S$, and therefore the surface is also directly proportional to the amount/weight of the bunch.

By measuring the cross-sectional area $Y_S$ of a bunch of spaghetti it is accordingly possible to directly determine the amount of spaghetti therein. This surface can either be determined by measuring the diameter $D_S$ if the surface is round, or two perpendicular adjacent sides if the surface is rectangular, or the base and the height if the surface is triangular, etc., whereafter these variables, in a known manner, are used to calculate said surface. For the grabber shown in FIG. 1 the principle of the rectangle has been put into practice. Accordingly, the height H and the width B have been chosen corresponding to a desired cross-sectional area $B \times H$. Empirical trials have determined how large the cross-sectional area has to be for a portion of each respective type of spaghetti product.

The grabber can be divided into a number of sections having different cross-sectional areas. Each such section could then be used to specify different sizes of portions for one certain type of spaghetti product. Another possibility is to use one and the same grabber for measuring a number of different spaghetti products and that each section accordingly defines one portion of a respective spaghetti product. In the first case, each section is marked with the respective amount whereas, in the second case, each section is marked in order to indicate which spaghetti product it defines a "normal" portion for. It has been found that a common type of spaghetti has a length of about 10 inches (approximately 25 cm) and that this kind of spaghetti amounts to one normal portion (approximately 100 g) if the cross-sectional area of the bunch is about 300 mm².

By means of a grabber in accordance with the invention it is easy to determine the amount of spaghetti that is to be cooked, and accordingly the final amount. Hence, one grabs a bunch of spaghetti and puts it easily into the desired section (see FIGS. 5 and 6). If it is a grabber of the first-mentioned kind, i.e, only for one spaghetti product, with different markings for different portions, one chooses that section which results in the desired quantity, e.g., a small portion, a normal portion or a large portion.

If it is desired to cook three normal portions of one spaghetti product, one repeatedly measures out three bunches in that section that is marked defining the normal portion. It is important that the section is filled to the top to obtain the exact amount. It is evident that this enables any desired number of portions of desired size to be measured.

Figure 5:
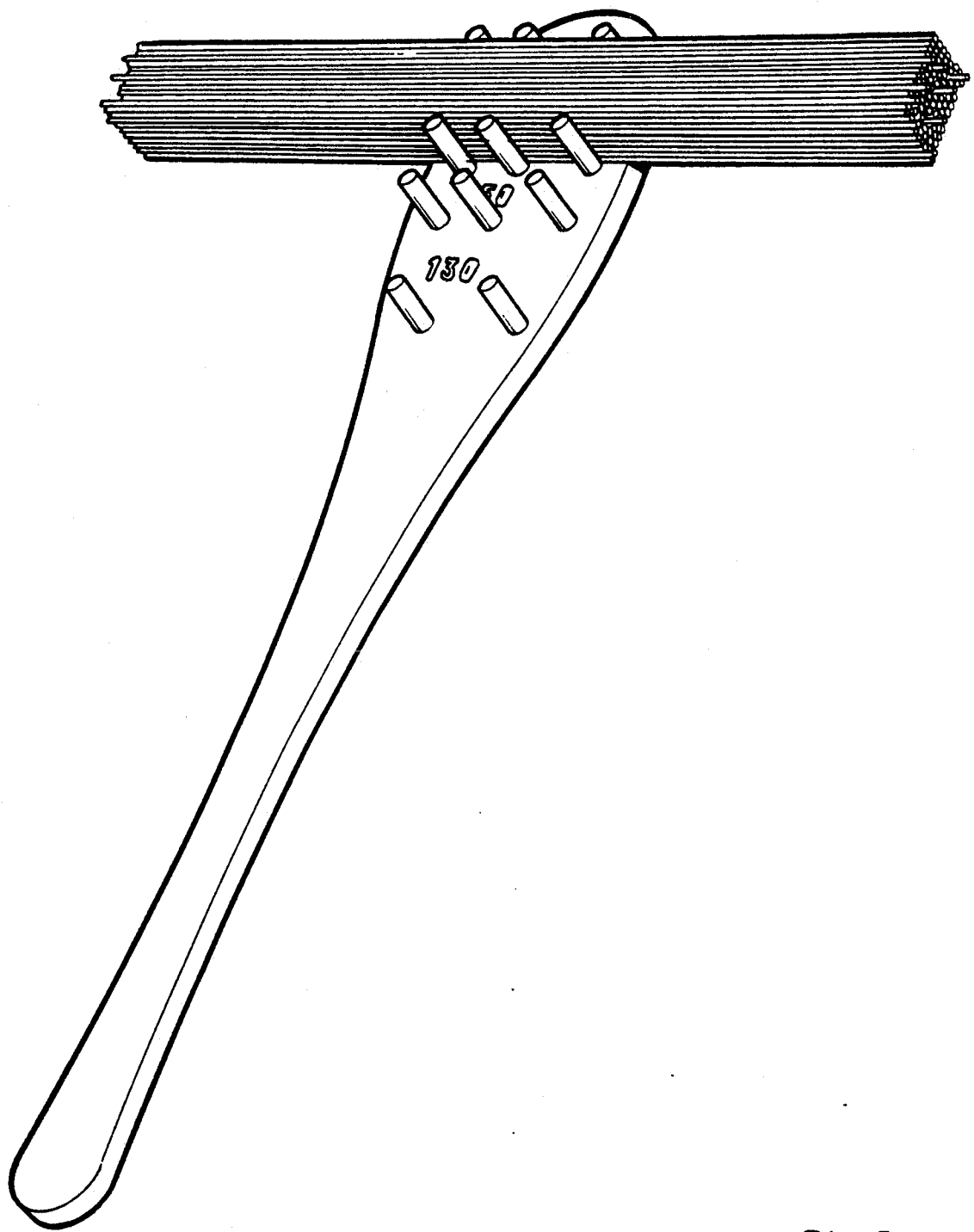
FIGS. 5, 6 show the use of the grabber.
Figure 6:
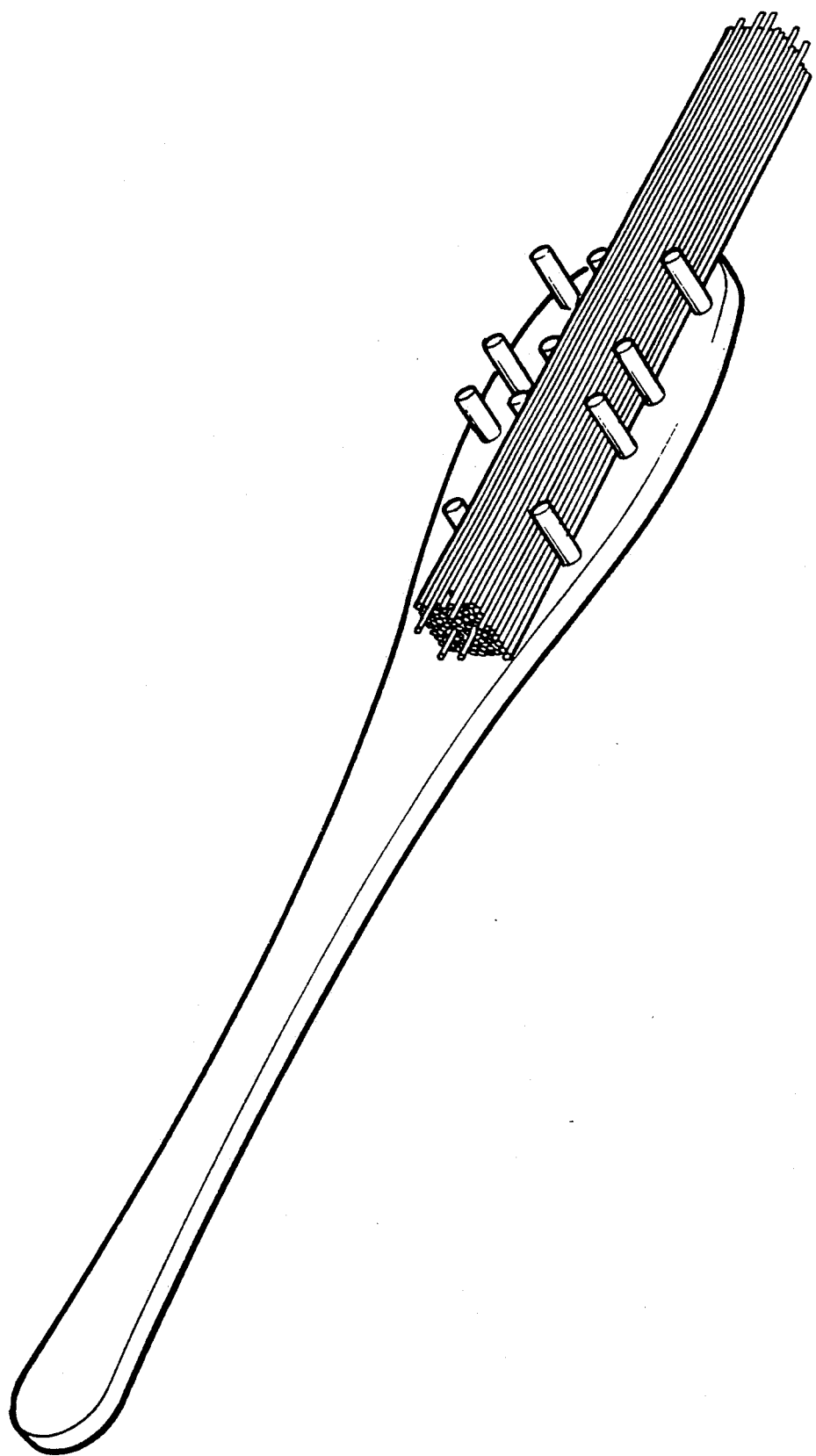

It should be noted that the delimitations of the sections that are shown in FIG. 1 are arranged both in a lengthwise direction as in a transverse direction (see also FIGS. 5 and 6).

in FIG. 8 there is shown a preferred embodiment of the invention. A differing feature is that the shaft 2 is used to measure. Accordingly, the shaft 2 is designed in a like a half-tube so as to have curved walls 2 presenting an inner surface 23 suitable for measuring spaghetti. This design also lends stiffness to the shaft. The largest amount that can be measured corresponds to two portions and is shown by a marking 25 adjacent to the top edge of the shaft 2. Below the marking 25 there is a "1-portion" marking, which defines the level of spaghetti for a single portion when it is almost totally covered by spaghetti when the grabber is held substantially horizontal.

Furthermore, as in the above embodiment, it is foreseen that the base portion 3 may also be used to measure, by using the supporting means defined by two opposing gaps between adjacent and opposing protruding elements 32 respectively. The free end of the shaft 2 has a tapered position 24, by means of which a relatively sharp edge 26 is created. This design enables an especially easy way of measuring, since the grabber thereby easily can be pushed into a larger bunch, e.g., a box containing spaghetti, after which the shaft 2 can be retracted and will be filled with spaghetti (with appropriate assistance of the user's fingers), especially if the box is appropriately tilted.

The grabber is preferably made of a polymer by form molding. The portions are preferably multiples of half a portion or are only whole portions. A preferred normal portion amounts to about 100 g, which normally gives a cross-sectional area of about 300 mm², and an optimum should be found within a 10% deviation. Of course, there could also be markings defining portions for children, i.e., between 50 and 100 g.

The skilled artisan will realize that the invention is not limited by the above but can be varied within the scope of the claims. It is accordingly possible to arrange the protruding devices 32 obliquely in relative to at least one the planes, so that the profile of the cross-section will have the form of a triangle with its top being cut-off. Such a design could make it easier to put the spaghetti into the grabber 1. Furthermore, it is of course possible for each section to define both a certain amount for a certain spaghetti product as well as the amount for another kind of a spaghetti product.

The shown preferred embodiment could instead of, or in combination with, the shown "1-portion" marking have a groove-like or similar means within the shaft, which would create something like a longitudinally extending fold in the shaft or preferably two symmetrically positioned such folds. Furthermore, the measuring portion of the shaft need not be totally upwardly open, as is shown, but could be made partly upwardly open (i.e the U-like cross-section would be close to an "O"-shape) or indeed be of a totally closed tube-like configuration, e.g., with a circle-like cross-section, which then has to be combined with at least one transverse groove to enable retaining of spaghetti once it is within the shaft.

In a preferred embodiment of the invention, however, each grabber is designed for measuring a certain spaghetti product, whereby the grabber preferably is clearly marked for which spaghetti product it is intended. Thanks to the low cost of a grabber in accordance with the invention it is not unlikely that each household will have several grabbers, one for each different spaghetti product one uses. It is further evident that the markings do not have to be integral with the grabber, but may be adhesive labels or other known easily attachable marking means. Moreover, it is of course possible to only inform the use, e.g. by a loose slip of paper in the package to be sold, of the size of the markings if in the form of folds or similar or filled-up portion devices.

I claim:

1. A spaghetti tool, comprising:
a shaft with a lengthwise extending grippable portion and a base portion, which is located at a first end the shaft;
protruding elements that protrude from the base portion for grabbing of cooked spaghetti; and
measuring means for measuring predetermined portions of different serving amounts of uncooked spaghetti, said measuring means including:
for each predetermined portion, a corresponding measurement channel;
for each measurement channel, a marking, provided on the tool indicating the serving amount of uncooked spaghetti that fits in the measurement channel, corresponding to one of the predetermined portions.

2. A spaghetti tool according to claim 1, in which the measuring means comprises an inner wall of the grippable portion of the shaft, which is substantially semi-cylindrical and forms the measuring channel, and the marking is made in the inner wall of the grippable portion corresponding to a level of uncooked spaghetti within the grippable portion, whereby the uncooked spaghetti is laid lengthwise in the grippable portion for measuring.

3. A spaghetti tool according to claim 1, in which:
the protruding elements extend substantially the same distance from the base portion and are arranged in substantially parallel, straight rows, with each pair of adjacent rows having a different spacing corresponding to one of the predetermined portions and forming one of the measurement channels;
the measuring means is formed of adjacent rows of the protruding elements and the base portion of the shaft.

4. A spaghetti tool according to claim 3, in which the protruding elements are further arranged in the base portion in substantially straight columns, with the space between each pair of adjacent columns defining one of the measuring channels.

5. A spaghetti tool according to claim 1, in which the marking is a separate element that is attachable on the tool.

6. A spaghetti tool according to claim 1, in which the marking is integral with the tool.

7. A combined spaghetti tool for measuring out portions of spaghetti and for grabbing spaghetti, comprising:
A. a shaft with a handle portion and a base portion;
B. combined measuring and grabbing means for pre-measuring a series of pre-determined, different serving amounts for uncooked spaghetti and for grabbing cooked spaghetti, said combined measuring and grabbing means including:
1) protruding elements that protrude to a substantially constant height form the base portion and are arranged in the base portion in substantially straight rows, whereby strands of spaghetti can be laid substantially parallel between adjacent rows of the protruding elements; and
2) a plurality of markings, with each marking corresponding to one of the series of predetermined, different serving amounts for uncooked spaghetti;
in which:
C. adjacent rows of protruding elements are spaced apart from each other in the base portion at a series of predetermined first horizontal distances;
D. for each adjacent pair of rows of protruding elements, the corresponding protruding elements and the base portion delimit one of the group of spaghetti portion measuring channels, each corresponding to one of the series of different serving amounts for uncooked spaghetti; and
E. the marking corresponding to each of the different serving amounts is attached to the base portion adjacent to the rows of protruding elements delimiting the corresponding spaghetti portion measuring channel;
whereby a user may measure out any one of the predetermined, different serving amounts of uncooked spaghetti by placing uncooked spaghetti strands into the corresponding spaghetti portion measuring channel until the channel is substantially filled.

8. A combined spaghetti tool as defined in claim 7, in which:
the protruding elements are further arranged in the base portion in substantially straight columns, whereby strands of spaghetti can be laid substantially parallel between adjacent columns of the protruding elements;
adjacent columns of protruding elements are spaced apart from each other in the base portion at a series of predetermined second horizontal distances;
for each adjacent pair of columns of protruding elements, the corresponding protruding elements and the base portion delimit one of the group of spaghetti portion measuring channels, each corresponding to one of the series of different serving amounts for uncooked spaghetti; and
the marking corresponding to each of the different serving amounts is attached to the base portion adjacent to the columns of protruding elements delimiting the corresponding spaghetti portion measuring channel.

9. A combined spaghetti tool as defined in claim 7, in which the markings are integral with the base portion.

10. A combined spaghetti tool for measuring out portions of spaghetti and for grabbing spaghetti, comprising:
A. a base portion;
B. protruding elements that protrude from the base portion for grabbing cooked spaghetti;
C. measuring means for pre-measuring at least one pre-determined serving amount for uncooked spaghetti, said measuring means including:
1) a handle portion of the tool that is connected with the base portion, said handle portion extending in a lengthwise direction and being generally semi-cylindrical and having a substantially semi-circular cross section forming a measuring channel for uncooked spaghetti;
2) for each predetermined serving amount, a marking in the measuring channel, said marking corresponding to a level of uncooked spaghetti placed lengthwise within the measuring channel that corresponds to the predetermined serving amount;

whereby a user may measure out each of the predetermined serving amounts of uncooked spaghetti by placing uncooked spaghetti strands lengthwise in the measuring channel until the spaghetti reaches the corresponding marking in the channel.

11. A combined spaghetti tool as defined in claim 10, in which the protruding elements are spaced apart so that opposing pairs of the protruding elements delimit additional measuring channels for uncooked spaghetti.

12. A combined spaghetti tool as defined in claim 10, in which the handle portion is open at an end opposite base portion and has an end edge that is tapered and forms scooping means for loading spaghetti into the measuring channel when the end edge of the handle portion is pressed mainly lengthwise into a bundle of lengthwise extending, uncooked spaghetti.

* * * * *